(12) United States Patent
Frank

(10) Patent No.: US 12,057,899 B2
(45) Date of Patent: Aug. 6, 2024

(54) METHOD AND APPARATUS INCLUDING ERROR VECTOR MAGNITUDE DEFINITION AND TESTING FOR ANTENNA PORTS AND MULTI-LAYER TRANSMISSIONS

(71) Applicant: Lenovo (Singapore) Pte. Ltd., New Tech Park (SG)

(72) Inventor: Colin Frank, Park Ridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/916,996

(22) PCT Filed: Apr. 12, 2021

(86) PCT No.: PCT/IB2021/053010
§ 371 (c)(1),
(2) Date: Oct. 4, 2022

(87) PCT Pub. No.: WO2021/205416
PCT Pub. Date: Oct. 14, 2021

(65) Prior Publication Data
US 2023/0163813 A1 May 25, 2023

Related U.S. Application Data

(60) Provisional application No. 63/008,428, filed on Apr. 10, 2020.

(51) Int. Cl.
*H04B 7/0413* (2017.01)
(52) U.S. Cl.
CPC ............... *H04B 7/0413* (2013.01)

(58) Field of Classification Search
CPC .................................................. H04B 7/0413
(Continued)

(56) References Cited

U.S. PATENT DOCUMENTS 9,936,462 B2   4/2018  Choi et al.
2005/0059400 A1*  3/2005  Jagadeesan ........... H04W 36/30
                                              455/67.11
(Continued)

OTHER PUBLICATIONS

PCT International Search Report for PCT/IB2021/053010, Lenovo (Singapore) Pte. Ltd., mailing date—Jun. 15, 2021.
(Continued)

*Primary Examiner* — Lihong Yu
(74) *Attorney, Agent, or Firm* — Loppnow & Chapa

(57) ABSTRACT

A method and apparatus are provided, where a data sequence for transmission is identified (1002) as part of evaluating transmitter performance involving multiple physical antennas. The data sequence is mapped (1004) to the multiple physical antennas to be involved in the transmission. The data sequence is then transmitted (1006) using the multiple physical antennas from which a signal quality metric of a transmitter corresponding to a difference between a received signal associated with the transmission of each respective data symbol of the data sequence and a respective ideal location of a predefined constellation point associated with the data symbol that was transmitted can be determined, wherein an error vector magnitude involving an aggregated difference associated with the data sequence involving the transmission via the multiple physical antennas is determined.

14 Claims, 8 Drawing Sheets

(58) Field of Classification Search
USPC .......................................................... 375/267
See application file for complete search history.

(56) References Cited

U.S. PATENT DOCUMENTS

| | | | |
|---|---|---|---|
| 2010/0074352 A1* | 3/2010 | Chen ................... | H04L 25/0246 375/260 |
| 2014/0086190 A1* | 3/2014 | Shimanuki ........... | H04B 7/0478 370/329 |
| 2017/0078133 A1* | 3/2017 | Terry ..................... | H04J 11/003 |
| 2019/0115941 A1 | 4/2019 | Noda | |
| 2019/0342136 A1* | 11/2019 | Hadani ................ | H04L 27/2697 |
| 2022/0182112 A1* | 6/2022 | Laporte ............... | H04L 27/2614 |

OTHER PUBLICATIONS

3GPP TS 36.101 V16.5.0 (Mar. 2020), 3rd Generation Partnership Project; Technical Specification Group Radio Access Network; Evolved Universal Terrestrial Radio Access (E-UTRA); User Equipment (UE) radio transmission and reception (Release 16), 1884 pages.

3GPP TS 38.101-1 V16.3.0 (Mar. 2020), 3rd Generation Partnership Project; Technical Specification Group Radio Access Network; NR; User Equipment (UE) radio transmission and reception; Part 1: Range 1 Standalone (Release 16).

3GPP TS 38.101-2 V16.3.1 (Mar. 2020), 3rd Generation Partnership Project; Technical Specification Group Radio Access Network; NR; User Equipment (UE) radio transmission and reception; Part 2: Range 2 Standalone (Release 16).

Nec et al., "TP on Error Vector Magnitude Requirements for AAS BS TR", R4-142439, for 3GPP TSG-RAN WG4 Meeting #70bis, San Jose del Cabo, Mexico, Mar. 31-Apr. 4, 2014.

Qualcomm Inc., "TX EVM test condition correction for ULMIMO", R4-1913226, for 3GPP TSG-RAN WG4 Meeting #93, Reno, NV, USA, Nov. 18-22, 2019.

Qualcomm Inc., "FR1 TX EVM test condition correction for ULMIMO", R4-2000204, for 3GPP TSG-RAN WG4 Meeting #94-e, Online, Feb. 24-Mar. 6, 2020.

Dick Walvis et al., "MIMO WLAN test methodologies for manufacturing", RF Design, Primedia Business Magazine & Media, Overland Park, KS, US, vol. 30, No. 6, Jun. 2007, pp. 26, 28-30, XP-001542533.

* cited by examiner

| Parameter | Unit | Average EVM Level | Reference Signal EVM Level |
|---|---|---|---|
| QPSK Or BPSK | % | 17.5 | 17.5 |
| 16 QAM | % | 12.5 | 12.5 |
| 64 QAM | % | 8 | 8 |
| 256 QAM | % | 3.5 | 3.5 |

FIG. 2

| Parameter | Unit | Average EVM Level |
|---|---|---|
| Pi/2-BPSK | % | 30 |
| QPSK | % | 17.5 |
| 16 QAM | % | 12.5 |
| 64 QAM | % | 8 |
| 256 QAM | % | 3.5 |

FIG. 3

| Parameter | Unit | Average EVM Level | Reference Signal EVM Level |
|---|---|---|---|
| Pi/2 BPSK | % | 30.0 | 30.0 |
| QPSK | % | 17.5 | 17.5 |
| 16 QAM | % | 12.5 | 12.5 |
| 64 QAM | % | 8.0 | 8.0 |

FIG. 4

METHOD AND APPARATUS INCLUDING ERROR VECTOR MAGNITUDE DEFINITION AND TESTING FOR ANTENNA PORTS AND MULTI-LAYER TRANSMISSIONS

FIELD OF THE INVENTION

The present disclosure is directed to an error vector magnitude definition and testing for antenna ports and multi-layer transmissions involving multiple physical antennas.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

In environments, where multiple devices each having their own transmitters may be operating, which share the same or a nearby channel space, the performance of any one of the transmitters of any one of the devices can emit electromagnetic energy which extends beyond the assigned channel and could potentially negatively impact the ability of another device to communicate in the same or a nearby channel. Correspondingly, devices may be tested to help better insure that they are operating in a manner, which meets certain predefined operating parameters, before they are allowed to be used in a network, so as to help better manage the performance of the network in general, and so as to better avoid the potential for negative consequences to other nearby devices.

At least one measure that can be used to quantify transmitter performance is referred to as an error vector magnitude (EVM). An error vector magnitude seeks to quantify the degree to which a signal may deviate from its intended perfect performance. In many forms of communication, information is encoded into the signal being transmitted, which corresponds to one of a plurality of predefined constellation points. Within the signal, the various constellation points can be used to define the value of the information being conveyed for that portion of the signal. The error vector magnitude relates to the degree to which the constellation point that was received differs from the constellation point that was intended to be sent. At least some standards define acceptable limits relative to EVM within which the transmitter needs to operate, and provide for the testing of the same.

Historically, EVM has only been defined for single antenna transmissions. However increasingly, communication standards are being defined, in which multiple physical antennas are being used in support of a particular transmission, such as via a particular defined communication port, which can each be mapped to multiple physical antennas, as well as in instances in which multiple input multiple output (MIMO) transmission layers are being defined and used.

The present inventor has recognized that it would be beneficial to develop definitions for error vector magnitude that can be used to quantify transmitter performance for transmissions involving multiple physical antennas and being able to test for the same, where in at least some instances an aggregated difference associated with a data sequence involving a transmission via the multiple physical antennas can be determined.

SUMMARY

The present application provides a method in a user equipment. The method includes identifying a data sequence for transmission. The data sequence is mapped to multiple physical antennas to be involved in the transmission. The data sequence is then transmitted using the multiple physical antennas from which a signal quality metric of a transmitter corresponding to a difference between a received signal associated with the transmission of each respective data symbol of the data sequence and a respective ideal location of a predefined constellation point associated with the data symbol that was transmitted can be determined, wherein an error vector magnitude involving an aggregated difference associated with the data sequence involving the transmission via the multiple physical antennas is determined.

According to another possible embodiment, a user equipment including multiple physical antennas is provided. The user equipment includes a controller that identifies a data sequence for transmission, wherein the data sequence is mapped by the controller to the multiple physical antennas involved in the transmission. The user equipment further includes a transmitter that transmits the data sequence using the multiple physical antennas from which a signal quality metric of a transmitter corresponding to a difference between a received signal associated with the transmission of each respective data symbol of the data sequence and a respective ideal location of a predefined constellation point associated with the data symbol that was transmitted can be determined, wherein an error vector magnitude involving an aggregated difference associated with the data sequence involving the transmission via the multiple physical antennas is determined.

According to a further possible embodiment, a method in a network entity is provided. The method includes receiving at one or more physical antennas of the network entity a data sequence transmitted from the user equipment, where the data sequence has been mapped to multiple physical antennas of the user equipment involved in the transmission. A signal quality metric of a transmitter of the user equipment corresponding to a difference between the received signal associated with the transmission of each respective data symbol and a respective ideal location of a predefined constellation point associated with the data symbol that was transmitted is determined, wherein an error vector magnitude involving an aggregated difference associated with the data sequence involved in the transmission via the multiple physical antennas is determined.

According to a still further possible embodiment, a network entity for communicating with a user equipment is provided. The network entity includes a receiver that receives at one or more physical antennas of the network entity a data sequence transmitted from the user equipment, where the data sequence has been mapped to multiple physical antennas of the user equipment involved in the transmission. The network entity further includes a controller that determines a signal quality metric of a transmitter of the user equipment, the signal quality metric corresponding to a difference between the received signal associated with the transmission of each respective data symbol and a respective ideal location of a predefined constellation point associated with the data symbol that was transmitted, wherein an error vector magnitude involving an aggregated difference associated with the data sequence involved in the transmission via the multiple physical antennas is determined.

These and other features, and advantages of the present application are evident from the following description of one or more preferred embodiments, with reference to the accompanying drawings.

BRIEF DESCRIPTION OF THE DRAWINGS

FIG. 2 is a table of the minimum requirements for meeting the requirements for error vector magnitude (EVM) defined for a single antenna transmission for various forms of modulation, as provided in existing 3GPP technical standard 36.101;

FIG. 3 is a table of the minimum requirements for meeting the requirements for error vector magnitude defined for a single antenna transmission for various forms of modulation, as provided in existing 3GPP technical standard 38.101-1;

FIG. 4 is a table of the minimum requirements for meeting the requirements for error vector magnitude defined for a single antenna transmission for various forms of modulation, as provided in existing 3GPP technical standard 38.101-2;

DETAILED DESCRIPTION OF THE PREFERRED EMBODIMENT(S)

Figure 1:
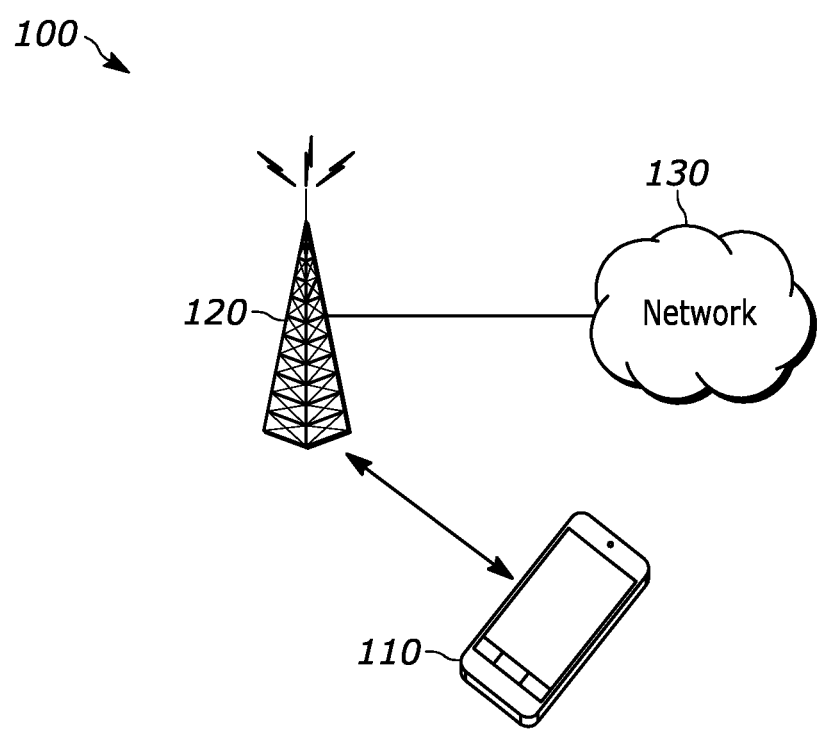
FIG. 1 is a block diagram of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide error vector magnitude definition and testing for antenna ports and multi-layer transmissions.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

A fundamental quality metric of signal transmission is the error vector magnitude (EVM). The EVM is defined as the normalized root-mean-square, expressed as a percentage, of the difference between the ideal modulated signal and the signal out the transmitter. The EVM is a fundamental limit on the signal-to-noise ratio of the transmission. The channel error rate is a function of both the signal-to-noise ratio, for which the lower bound is determined by the EVM, and the modulation constellation. For a given signal-to-noise ratio, the channel error rate increases as the size of the modulation constellation is increased. As a result, to achieve a given lower bound on the channel error rate, the EVM must be reduced as the size of the constellation is increased and this is reflected in the 3rd Generation Partnership Project (3GPP) Technical Specification (TS) including TS 36.101, TS 38.101-1 and TS 38.101-2. In each of these instances, the requirements as provided by the specs are provided in respective tables.

More specifically, FIG. 2 illustrates a table 200 of the minimum requirements for meeting the requirements for error vector magnitude (EVM) defined for a single antenna transmission for various forms of modulation, as provided in existing 3GPP technical specification 36.101.

FIG. 3 illustrates a table 300 of the minimum requirements for meeting the requirements for error vector magnitude defined for a single antenna transmission for various forms of modulation, as provided in existing 3GPP technical specification 38.101-1.

FIG. 4 illustrates a table 400 of the minimum requirements for meeting the requirements for error vector magnitude defined for a single antenna transmission for various forms of modulation, as provided in existing 3GPP technical specification 38.101-2.

Figure 5:
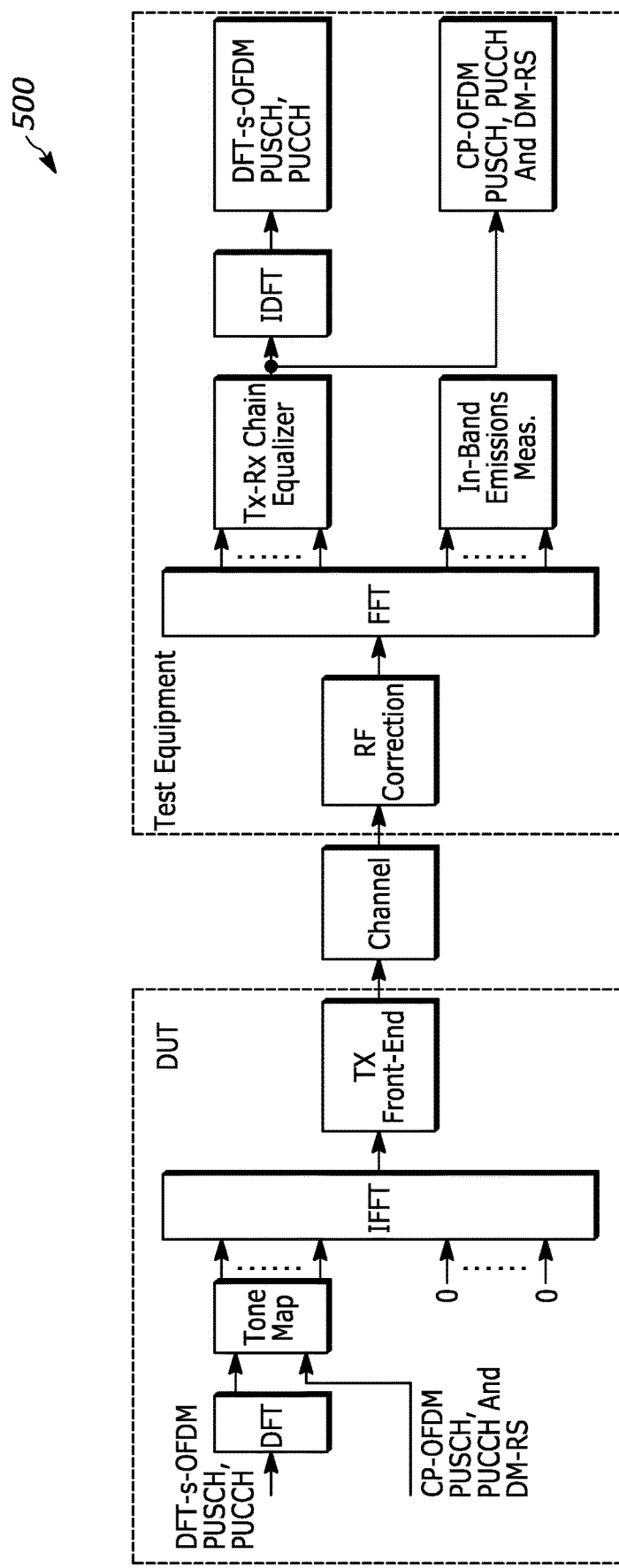
FIG. 5 is a block diagram identifying the error vector magnitude measurement points for a device having a transmitter being tested relative to an exemplary test equipment for transmission on a single physical antenna.

Currently, EVM is only defined for single antenna transmissions. Correspondingly, the technical specification outlines an approach for determining EVM in instances in which only a single antenna is defined for transmission. The respective approaches can be found in Appendix F of each of TS 36.101, TS 38.101-1 and TS 38.101-2. The fact that the approach outlined in the existing technical specification addresses instances in which only a single antenna is defined is interesting, since 3GPP defines transmissions from antenna ports, and not from antennas, where an antenna port can be comprised of multiple physical antennas. Thus, there is a gap in the technical specification in that there is no fundamental transmit signal quality measure for the transmission from multiple physical antennas. FIG. 5 illustrates a block diagram 500 identifying the error vector magnitude measurement points for a device having a transmitter being tested relative to an exemplary test equipment for transmission on a single physical antenna. The block diagram 500 is Figure F.1-1 taken from Annex F of TS 38.101-1.

Currently, there has been a discussion in RAN4, of whether the EVM can be measured independently for the two transmit antenna connectors (not ports) in a conductive test. RAN4 is the portion of the working groups working on the standards, which works on radio frequency aspects of the developing standard including the performance of simulations and the development of the minimum requirements for transmission and reception parameters, radio resource management (RRM), and for channel demodulation and channel state information (CSI) reporting. One company has proposed that each antenna connector should be tested independently with the transmit chain for the other antenna connector off. Another company has insisted that when measuring the EVM on one antenna connector, the transmit chains for both antennas must be turned on. The first company states that it is not necessary to turn on the second transmit chain since any leakage from the second transmit chain into the first transmit chain is similar to in nature to the combining of layers that occur in the channel and thus the leakage can be removed by the MIMO receiver. However, this argument is only qualitative in nature and does not provide any evidence that the leakage would not introduce a noise floor, or equivalently, a ceiling in performance. The second company argues that the second transmitter must be turned on during testing, since even if leakage from the second transmitter into the first can be removed by the MIMO receiver, there may be nonlinear mixing of the signals on the two transmit chains which produce interference that could not be suppressed by the MIMO receiver.

Since there is no proof that nonlinear mixing between the two transmit chains will not introduce a noise floor that cannot be removed by the MIMO receiver, it seems that EVM should be tested with both transmitter chains turned on. However, since the linear coupling between the two antennas can be significant, it may not in general be possible to measure the EVM independently for the two transmit chains since the linear coupling from the second transmit chain into the first transmit chain can likely cause the first transmit chain to (incorrectly) fail EVM.

So, what would be beneficial are the following:
  i) An EVM test that works with both transmit chains turned on,
  ii) An EVM test that is defined generally for an antenna port, and
  iii) An EVM test that applies for multi-layer transmission.

The traditional approaches are noted in Annex F of TS 36.101-1, TS 38.101-1, and TS 38.101-2. The EVM requirements as a function of modulation type are noted in FIGS. 2-4. For example, FIG. 5 shows the test points for a method of evaluating EVM.

The traditional approaches typically only define EVM for a transmit antenna and not for an antenna port. Additionally, the traditional approaches typically do not define EVM for a UE with multiple active transmit chains.

Embodiment 1

The first exemplary embodiment of the present application focuses more on items (i) and (ii), noted above.

With this method, a single layer precoder from any codebook can be used to transmit the data. However, it may be desirable to exclude precoding vectors having 0 values, such as [0 1] and [1 0] (for two transmit antennas), though the EVM definition should be able to handle such cases.

The method for measuring EVM is then for the test equipment to apply the zero-forcing MIMO receiver (as opposed to the MMSE receiver) on the demodulated signal (i.e., the output of the fast Fourier transform (FFT)). Since the transmitter may have a frequency dependence across the channel due to filters, the zero-forcing MIMO receiver should be computed separately for each subcarrier. For orthogonal frequency division multiplexing (OFDM) modulation, the mean-squared error is then computed as the square of absolute value of the difference between the output of the zero-forcing multiple input multiple output (MIMO) receiver for each subcarrier and the corresponding known modulation symbol for the given subcarrier, averaged over all subcarriers of all allocated resource blocks (RB's). The normalized mean-squared error is the mean-squared error divided by the mean-squared value of the modulated symbols for the subcarriers of all allocated RB's. The EVM is computed as a percentage as the square-root of the normalized mean-squared error multiplied by 100.

It should be noted that prior to the FFT used to demodulate, the local oscillator (LO) leakage should be removed from each transmit chain.

As an additional detail, the zero-forcing MIMO receiver (which is equivalent to a matched filter for a single layer) is given by the following expression $$\hat{x} = (h^* \times h)^{-1} h^* y$$

where $\hat{x}$ is the estimate of the modulation symbol x for the subcarrier and y is the 2×1 vector output of the FFT demodulators for the first and second transmit chains for the subcarrier. The vector h is the 2×1 vector of channel estimates for the demodulators of the first and second receive chains for the given subcarrier (which is, of course, a function of the precoder that is applied).

For direct Fourier transform spread orthogonal frequency division multiplexing (DFT-s-OFDM), the method given above may need to be modified slightly. As above, the zero-forcing MIMO receiver is used to get a symbol estimate for each subcarrier. However, after the zero-forcing MIMO receiver is applied, the inverse discrete Fourier transform (IDFT) is applied to the symbol estimates for the subcarriers of the allocated RB's in order to form estimates of the modulated data symbols. The EVM is then computed based on the normalized mean-square error of the differences between the output of the IDFT and the known data symbols.

It can be noted that Method 1 provides an EVM definition per port as opposed to an EVM definition per antenna. It can also be noted that this method can be extended to any number of transmit antennas by increasing the length of the channel vector h in accordance with the number of antennas.

In the absence of a coupling that depends on the precoder, the measured EVM should in principle be independent of the precoder that is used to measure the EVM. However, if this is not the case, then it may be beneficial to consider averaging the EVM measurement over multiple precoders.

Embodiment 2

The second exemplary embodiment is similar to the above method except that it in addition to (i) and (ii), it also addresses (iii), that is, it addresses EVM for multi-layer transmissions.

The method is similar to the method of the first embodiment except that a multi-layer precoder from any codebook can be used to transmit the data. For multi-layer transmission, the output of the zero-forcing MIMO receiver is given by $$\hat{x} = \vec{H}^{-1} y$$

where the vector $\hat{x}$ is the estimate of the modulation vector of modulation symbols x for the two layers of the subcarrier and y is the 2×1 vector output of the FFT demodulators for the first and second transmit chains for the subcarrier. The vector H is the 2×2 vector of channel estimates for the demodulators of the first and second receive chains for the given subcarrier (which is, of course, a function of the precoder that is applied). Thus, $H_{ij}$ is the output of the FFT demodulator for the j-th transmit chain due to the i-th transmission layer.

It should be noted that prior to the FFT used to demodulate, the LO leakage should be removed from each transmit chain.

For cyclic prefix-orthogonal frequency division multiplexing (CP-OFDM) modulation, the EVM can be computed for each layer in a manner similar to that for single layer transmission. The EVM requirement can then be applied to each layer separately, or the requirement can be applied after averaging between layers.

For multi-layer transmissions, there may be no need to consider DFT-s-OFDM modulation as it is typically not allowed.

Depending on the amount of coupling (linear and otherwise) between the transmit chains, it is possible that the EVM will depend on the precoder, so it may need to be considered whether the EVM requirement should be evaluated for multiple multi-layer precoders, and whether the average or the max EVM should be used in setting the requirement.

It can be noted that this method for defining EVM can be applied to arbitrary numbers of antennas and to any number of layers generally less than or equal to the number of antennas.

Embodiment 3

The third exemplary embodiment uses the traditional method for measuring EVM in combination with Embodiments 1 or 2. In the first step, the traditional EVM evaluation method is used on each transmit chain independently, but with both transmit chains turned on. If both transmit chains pass using this method, the device passes and the test is stopped and the device passes EVM. If either transmit chain 1 or transmit chain 2 fails the traditional EVM evaluation, then Embodiment 1 or Embodiment 2 is used, as appropriate. If the UE passes EVM for the second test, then the device passes. If not, the device fails.

There is currently no agreed upon method for evaluating EVM for a UE transmitter with multiple transmit chains operated simultaneously. In this disclosure, multiple methods are proposed for addressing this problem.

Additionally, there is currently no 3GPP definition for EVM for an antenna port, which is in general a linear combination of multiple antennas.

This disclosure proposes methods for defining and measuring EVM for antenna ports. Furthermore, the disclosure proposes methods for defining and measuring EVM for multi-layer MIMO transmissions.

Spectral Flatness Requirement

Above, it has been proposed that a linear zero-forcing MIMO receiver be used to define EVM for general antenna ports and single-layer and multi-layer MIMO transmissions. When defining EVM for a physical antenna, an equalizer can be used to compensate for gain variation across frequency before the EVM is measured. Typically, however, a spectral flatness requirement is applied to the frequency domain equalizer that is used prior to the EVM measurement. The reason for this requirement is if eNB/gNB receiver needs to apply a large gain at the edge of the channel to equalize the signal, this can result in significant noise enhancement. Essentially, the spectral flatness requirement corresponds to a limitation on the gain rolloff at the edge of the UE's duplex filter.

For the same reason as in the case of EVM measurement for a physical antenna, it may be likely that there will be a need to enforce a spectral flatness criteria on linear zero-forcing MIMO receiver. One way to do this is to first sum the squares of the amplitudes of the two coefficients used for each subcarrier to combine the FFT's corresponding to the two receive antennas, and apply the existing spectral flatness criteria to the resulting values. It may be further possible to evaluate spectral flatness using the square root of the sum of the squares. For multi-layer MIMO, the spectral flatness criteria could be applied to each layer separately, or the flatness requirement could be applied to the average of the values for each subcarrier.

A further possibility is to only enforce the spectral flatness constraint when transmitting on an antenna port that maps to a single physical antenna, and to do this for each physical antenna. Only checking these cases could be sufficient to better ensure that the duplexer for each transmit antenna does not roll off too much at the edge.

Applicability to a Larger Number of Antennas

For all of the examples above, typically only two physical antennas have been used by the UE. Thus, in these examples, an antenna port generally only maps to two physical antennas. However, in general, an antenna port can map to an arbitrary number of physical antennas. Thus, the definition of EVM for a port and the definition of EVM for a MIMO layer can be extended to mappings including any number of physical antennas.

Historically, as discussed in at least some prior proposals, the current definition of EVM only applies for a physical antenna, where for the purposes of frequency range 1 (FR1) a physical antenna corresponds to an antenna connector. As a result, there is currently no EVM definition for transmission on an antenna port that is not limited to a single physical antenna, and similarly, there is no EVM definition for transmission on a MIMO layer that is not limited to a single physical antenna. Thus, there is a gap in the existing technical specifications in that there is no fundamental transmit signal quality measure for transmission from an antenna port or for a MIMO layer mapping to multiple physical antennas. In the present filing, we consider how such EVM requirements could be defined.

EVM Definition for an Antenna Port or a Single MIMO Layer

Figure 6:
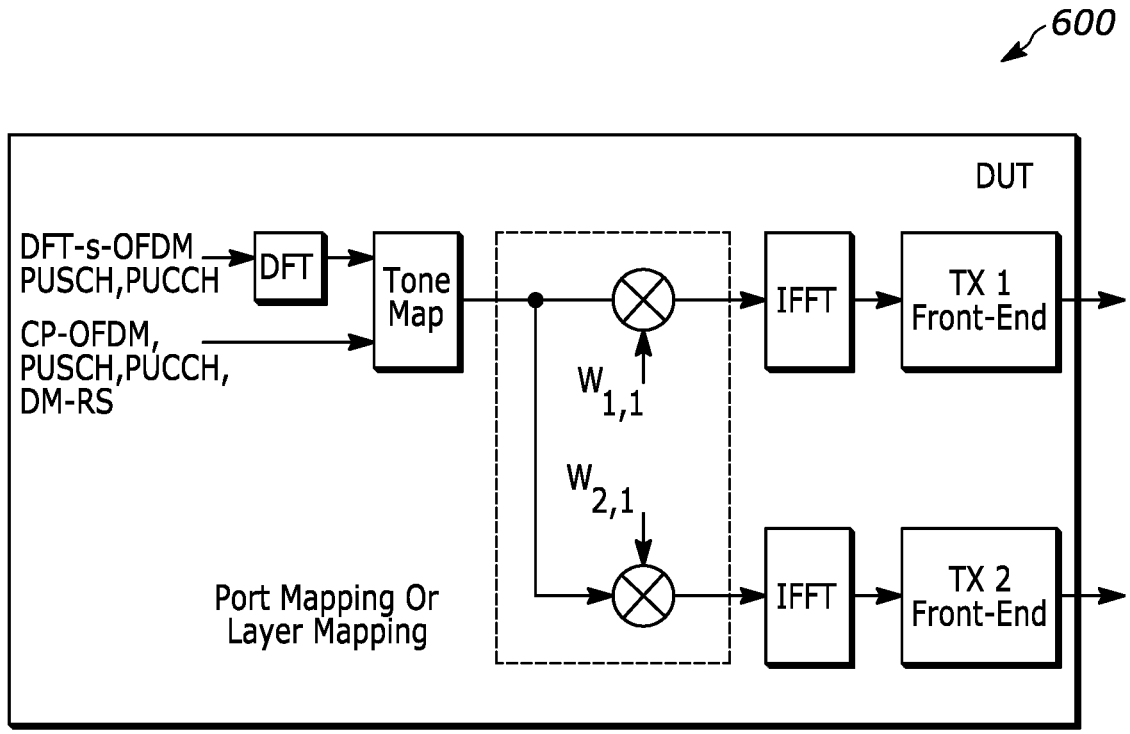
FIG. 6 is a block diagram of a user equipment implementation for an antenna port or a single MIMO layer corresponding to two physical antennas.

As noted previously, FIG. 5 is Figure F.1-1 from Annex F of TS 38.101-1 and shows the UE transmitter and the EVM measurement points for transmission on a single physical antenna. In contrast, FIG. 6 shows a block diagram 600 of the UE implementation of an antenna port or MIMO layer corresponding to two physical antennas. With this implementation, the same complex-valued antenna weights can be applied to all subcarriers, or alternatively, different complex-valued antenna weights can be applied to each subcarrier or to each RB. The antenna weighting can also be done after the IFFT, but in this case, the same complex weights are applied to all subcarriers.

Figure 7:
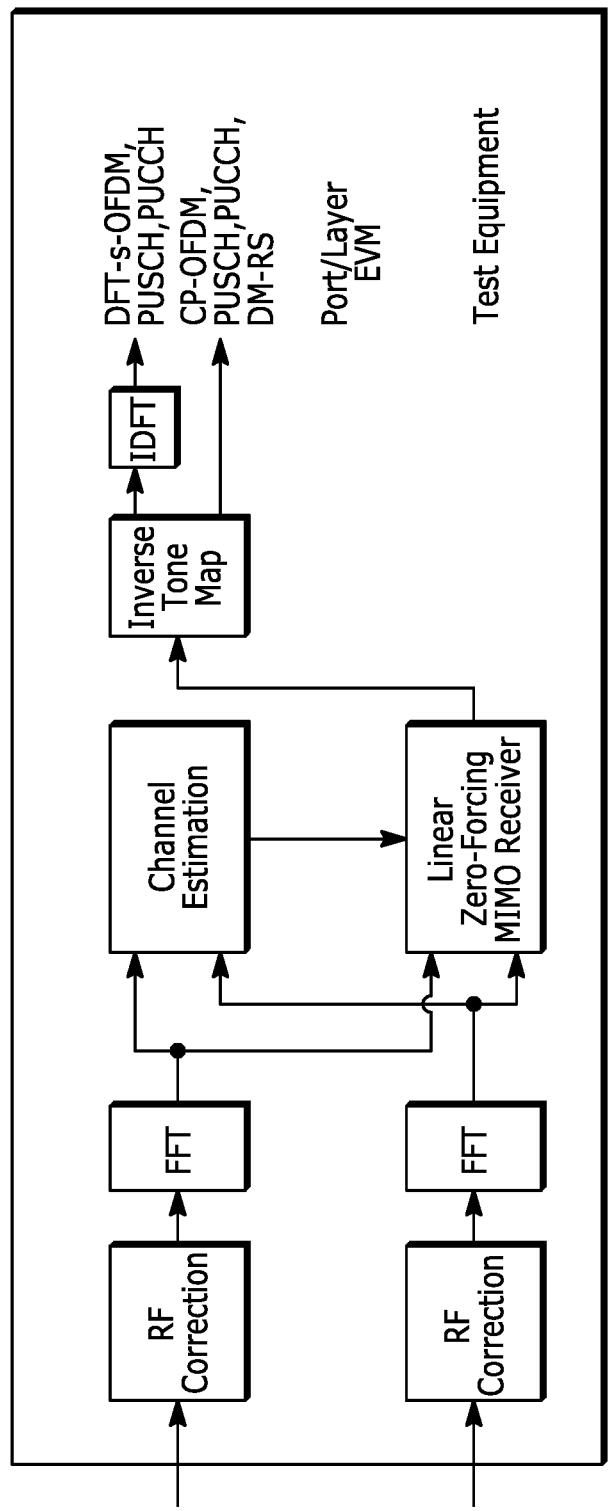
FIG. 7 is a block diagram of a test equipment for determining EVM for an implementation corresponding to an antenna port or a single MIMO layer corresponding to two physical antennas.

A method for evaluating EVM for the antenna port or MIMO layer is shown in FIG. 7 that corresponds to the minimum EVM that can be observed by a gNB receiver with two receive antennas. More specifically, FIG. 7 illustrates a block diagram 700 of a test equipment for determining EVM for an implementation corresponding to an antenna port or a single MIMO layer corresponding to two physical antennas. Note that this EVM definition would not apply for a gNB with a single receive antenna. The outputs of the FFT are provided to both the channel estimator and to the linear zero-forcing MIMO receiver. For each subcarrier output of each FFT, the channel estimator correlates with the corresponding data symbol for CP-OFDM and with the corresponding outputs of the DFT for DFT-s-OFDM to form the channel estimate $$h = \begin{bmatrix} h_1 \\ h_2 \end{bmatrix}$$

with this channel estimate, the linear unbiased estimate x of the modulation symbol x is given by $$\hat{x} = (h^H h)^{-1} h^H y$$

where $y = [y_1\ y_2]$ are the outputs of the first and second FFT's for the given subcarrier. For CP-OFDM, the error for the given symbol is then computed as $|x - \hat{x}|$, and the square-root of the sum of the squares of these errors over frequency is normalized and used to compute the EVM for the layer or port. For DFT-s-OFDM, the error is measured as $|x - \hat{x}'|$, where $\hat{x}' = \text{IDFT}(\hat{x})$.

In FIG. 7, the channel estimator uses the known data to estimate the channel. Thus, the test equipment does not require knowledge of the weighting vector w used by the UE to implement the port or layer mapping. The only requirement is that the port is implemented such in a manner such that the weighting vector w is constant during the measurement. From this, it follows that the test equipment does not require knowledge of the weighting vector w used by the UE to implement the port or layer mapping in order to order to measure the EVM for the port. As a result, EVM can be measured for transmission modes such as transparent transmit diversity (if w is constant during the measurement) even though the test equipment does not know how transparent transmit diversity is implemented by the UE. This leads to a couple of proposals that are supported by the present filing that could be implemented in current communication standards.

Proposal 1: For transmissions on a single antenna port or on a single MIMO layer, the EVM definition should assume the use of a linear zero-forcing MIMO receiver to estimate the modulation symbols.

Proposal 2: For transparent transmit diversity, the EVM definition should assume the use of a linear zero-forcing MIMO receiver to estimate the modulation symbols.

EVM Definition for Multi-Layer MIMO

Figure 8:
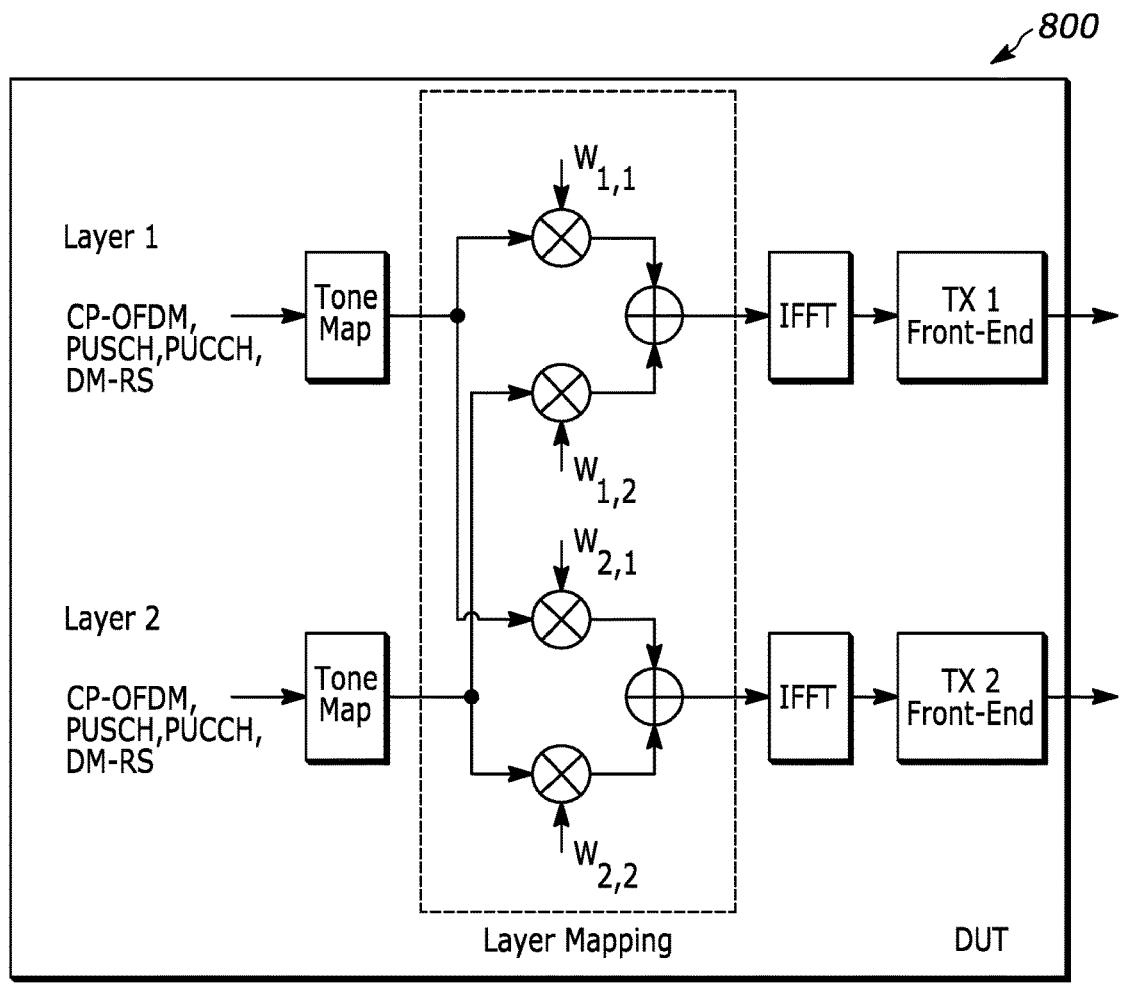
FIG. 8 is a block diagram of a user equipment implementation for a two layer MIMO corresponding to two physical antennas.

FIG. 8 illustrates a block diagram 800 of a UE implementation of a two layer MIMO transmission.

The method for evaluating EVM for the two-layer MIMO transmission is shown in FIG. 8. The outputs of the FFT's are provided to both the channel estimator and to the linear zero-forcing MIMO receiver. For each subcarrier output of each FFT, the channel estimator correlates with the corresponding data symbols to form the channel estimate $$H = \begin{bmatrix} h_{1,1} & h_{1,2} \\ h_{2,1} & h_{2,2} \end{bmatrix}$$

where the first column corresponds to channel estimates for the first layer and the second column corresponds to channel estimates for the second layer.

With this channel estimate, the linear unbiased estimate of the vector $\hat{x}$ of the vector data symbol x for the first and second layers is given as $$\hat{x} = H^H (H H^H)^{-1} y = H^{-1} y$$

where $y^T = [y_1\ y_2]$ are the outputs of the first and second FFT for the given subcarrier. The errors for the symbols on the first and second layer are computed as $|x_1 - \hat{x}_1|$ and $|x_2 - \hat{x}_2|$ and the square-root of the sum of the squares of these errors over frequency is normalized and used to compute the EVM for the first and second layers.

Figure 9:
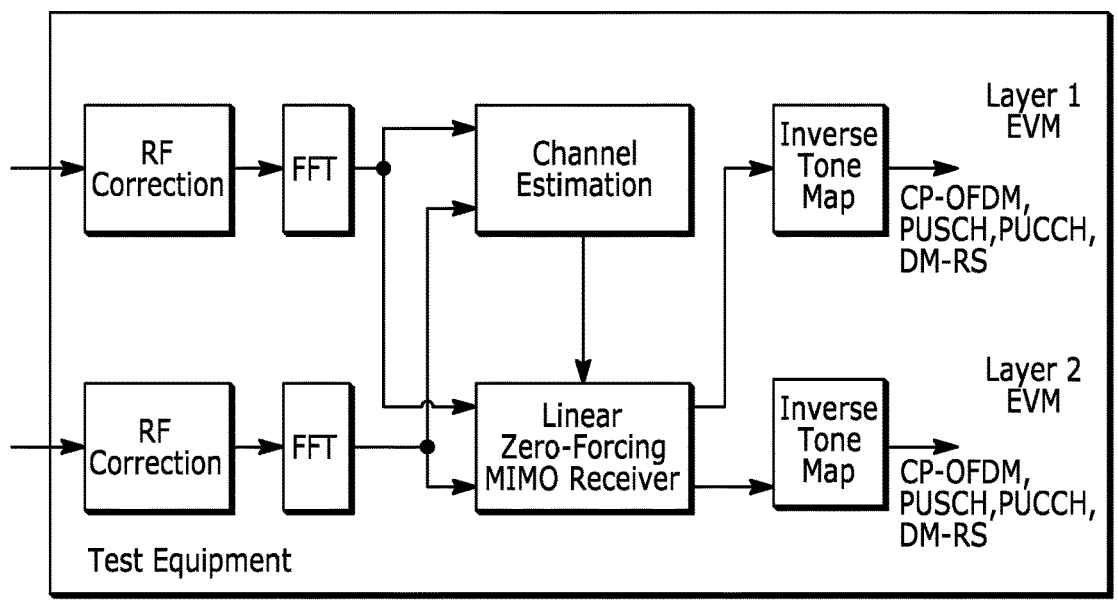
FIG. 9 is a block diagram of a test equipment for determining EVM for an implementation corresponding to a two layer MIMO corresponding to two physical antennas.

FIG. 9 illustrates a block diagram 900 of a test equipment for determining EVM for an implementation corresponding to a two layer MIMO corresponding to two physical antennas. As can be seen in FIG. 9, the EVM measurement can in general be layer dependent. Thus, there is a question as to whether the requirement should be based on the average of the EVM measurements, or on the maximum of the EVM measurements. Furthermore, depending on the size of the codebook that is used, there is a question as to whether the EVM should be measured for all precoders in the codebook, or for only a subset, and whether these EVM measurements should be averaged, or whether the maximum of the EVM measurements should be used. This leads to a couple of proposals that are supported by the present filing that could be implemented in current communication standards.

Proposal 3: For multi-layer MIMO transmission, the EVM definition should assume the use of a linear zero-forcing MIMO receiver to estimate the modulation symbols for each layer.

Proposal 4: When setting the EVM requirements for multi-layer MIMO transmission, the EVM measurements should be averaged over the MIMO layers and over the set of precoders for which EVM is measured.

It may be further and/or alternatively possible for the EVM requirement to be set so as to include a per layer EVM requirement that would need to be separately met for each of the multiple layers.

In summary, historically, as discussed in at least some prior proposals and the existing technical standards, the current definition of EVM generally only applies for a physical antenna, where for the purposes of FR1 a physical antenna corresponds to an antenna connector. As a result, there is currently no EVM definition for transmission on an antenna port that is not limited to a single physical antenna, and similarly, there is no EVM definition for transmission on a MIMO layer that is not limited to a single physical antenna. Thus, there is a gap in the technical specification in that there is no fundamental transmit signal quality measure for transmission from an antenna port or for a MIMO layer mapping to multiple physical antennas.

As such, in this filing, we propose methods for defining and measuring EVM for transmission from an antenna port or for a MIMO layer mapping to multiple physical antennas and for multi-layer MIMO transmissions.

Figure 10:
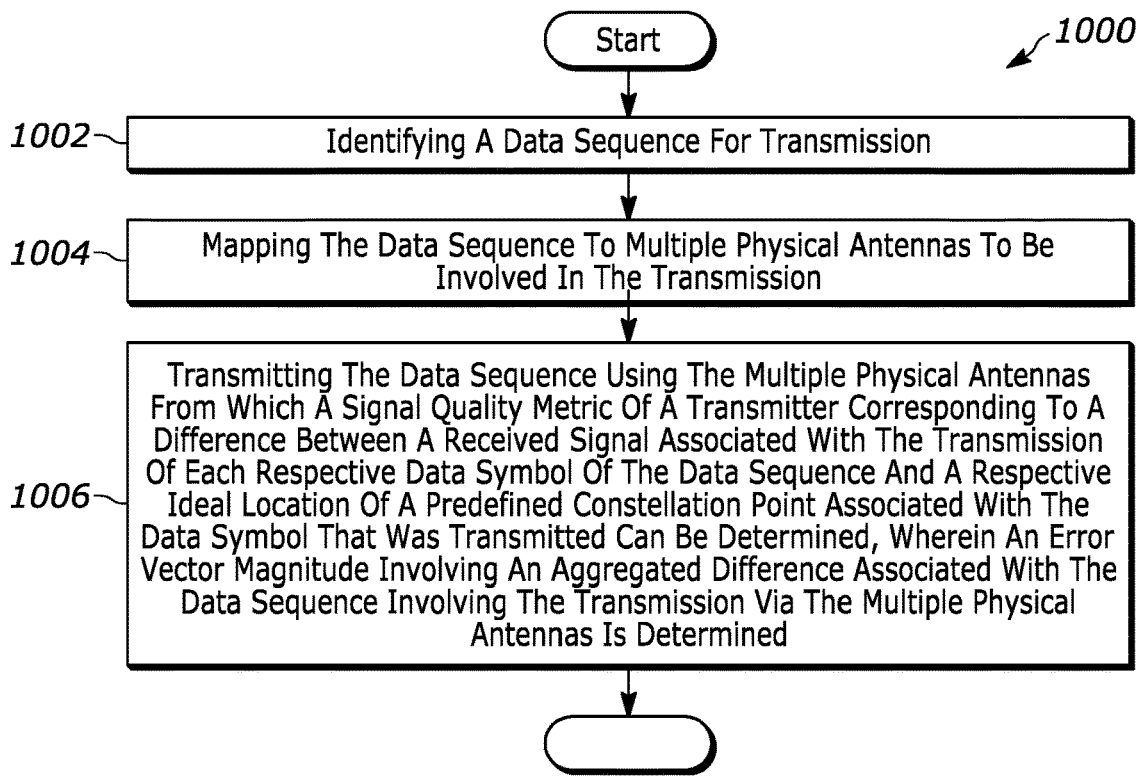
FIG. 10 is a flow diagram in a user equipment for supporting the determination of the transmitter EVM of the user equipment for a transmission involving multiple physical antennas.

FIG. 10 illustrates a flow diagram 1000 of a method in a user equipment for supporting the determination of the transmitter EVM of the user equipment for a transmission involving multiple physical antennas. The method includes identifying 1002 a data sequence for transmission. The data sequence is mapped 1004 to multiple physical antennas to be involved in the transmission. The data sequence is then transmitted 1004 using the multiple physical antennas from which a signal quality metric of a transmitter corresponding to a difference between a received signal associated with the transmission of each respective data symbol of the data sequence and a respective ideal location of a predefined constellation point associated with the data symbol that was transmitted can be determined, wherein an error vector magnitude involving an aggregated difference associated with the data sequence involving the transmission via the multiple physical antennas is determined.

In some instances, the mapping of the data sequence to the multiple physical antennas can be associated with one or more antenna ports, where each of the antenna ports is associated with one or more of the multiple physical antennas. In some of these instances, each of the antenna ports can be defined as a respective linear combination of one or more of the multiple physical antennas. Further, the error vector magnitude can be associated with an output of a zero forcing multiple input multiple output (MIMO) receiver respectively applied to the multiple physical antennas.

In some instances, a fast Fourier transform can be computed for the output of the receiver associated with a corresponding one of the multiple physical antennas. A separate zero forcing MIMO receiver can be computed for each subcarrier of each allocated resource block, based on a channel estimate for each carrier for each of the multiple physical antennas. The separate zero forcing MIMO receiver that is computed for each subcarrier can be applied to the output of the fast Fourier transform. The error vector magnitude can be measured by comparing the data symbols of the data sequence with the corresponding output of the zero forcing MIMO receiver.

In some instances, the mapping of the data sequence to the multiple physical antennas can be associated with multiple transmission layers, where each one of the multiple transmission layers is associated with one or more of the multiple physical antennas. In some of these instances, the error vector magnitude can be associated with an output of a zero forcing multiple input multiple output (MIMO) receiver respectively applied to the multiple physical antennas.

In some instances, a fast Fourier transform can be computed for the output of the receiver associated with a corresponding one of the multiple physical antennas. A separate zero forcing MIMO receiver can be computed for each subcarrier of each allocated resource block, based on a channel estimate for each carrier for each of the multiple physical antennas. The separate zero forcing MIMO receiver that is computed for each subcarrier can be applied to the output of the fast Fourier transform. Each output of the zero forcing MIMO receiver can corresponds to a different one of the multiple transmission layers. The error vector magnitude can be measured for the each one of the multiple transmission layers by comparing the data symbols of the data sequence with the corresponding output of the zero forcing MIMO receiver.

In some instances, the signal quality metric for the transmitter can be the average of the error vector magnitude measured for the each one of the multiple transmission layers. In some of these or other instances, a figure of merit for the transmitter can be determined, which corresponds to a determined maximum one of the error vector magnitude measured for the each one of the multiple transmission layers.

Figure 11:
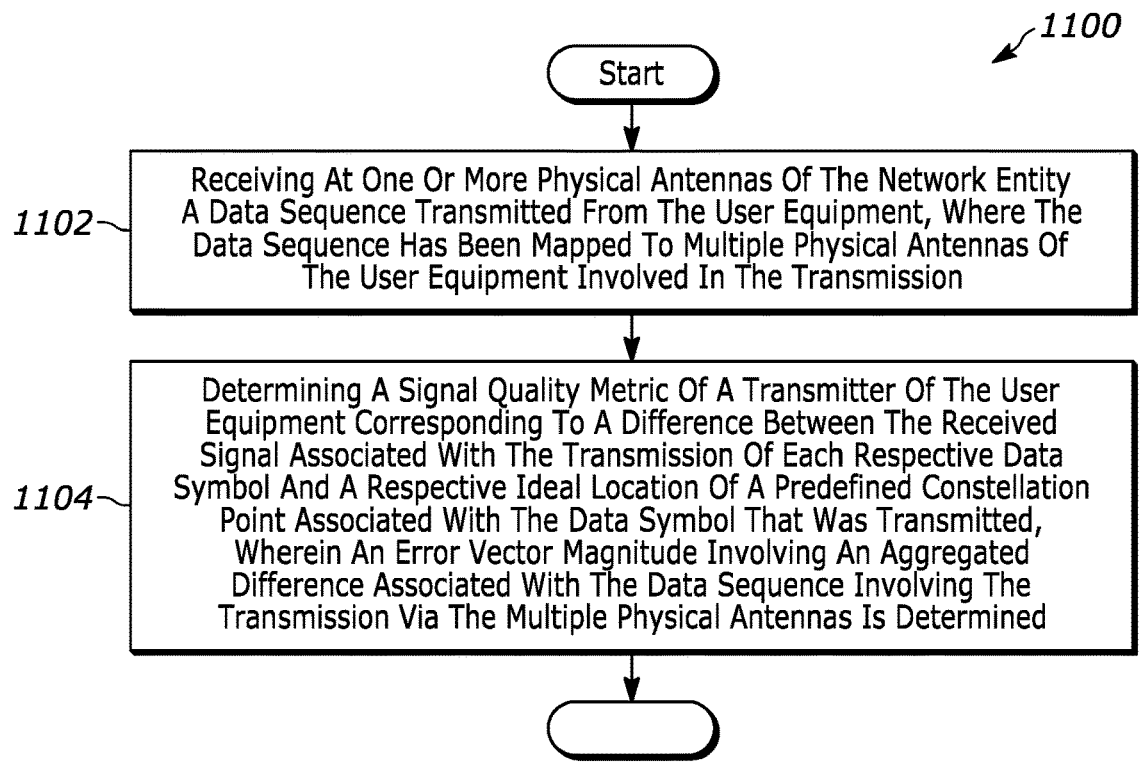
FIG. 11 is a flow diagram in a network entity, such as a test equipment for determining a transmitter EVM of a user equipment corresponding to a transmission involving multiple physical antennas.

FIG. 11 illustrates a flow diagram 1100 of a method in a network entity, such as a test equipment for determining a transmitter EVM of a user equipment corresponding to a transmission involving multiple physical antennas. The method includes receiving 1102 at one or more physical antennas of the network entity a data sequence transmitted from the user equipment, where the data sequence has been mapped to multiple physical antennas of the user equipment involved in the transmission. A signal quality metric of a transmitter of the user equipment corresponding to a difference between the received signal associated with the transmission of each respective data symbol and a respective ideal location of a predefined constellation point associated with the data symbol that was transmitted is determined 1104, wherein an error vector magnitude involving an aggregated difference associated with the data sequence involved in the transmission via the multiple physical antennas is determined.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 12:
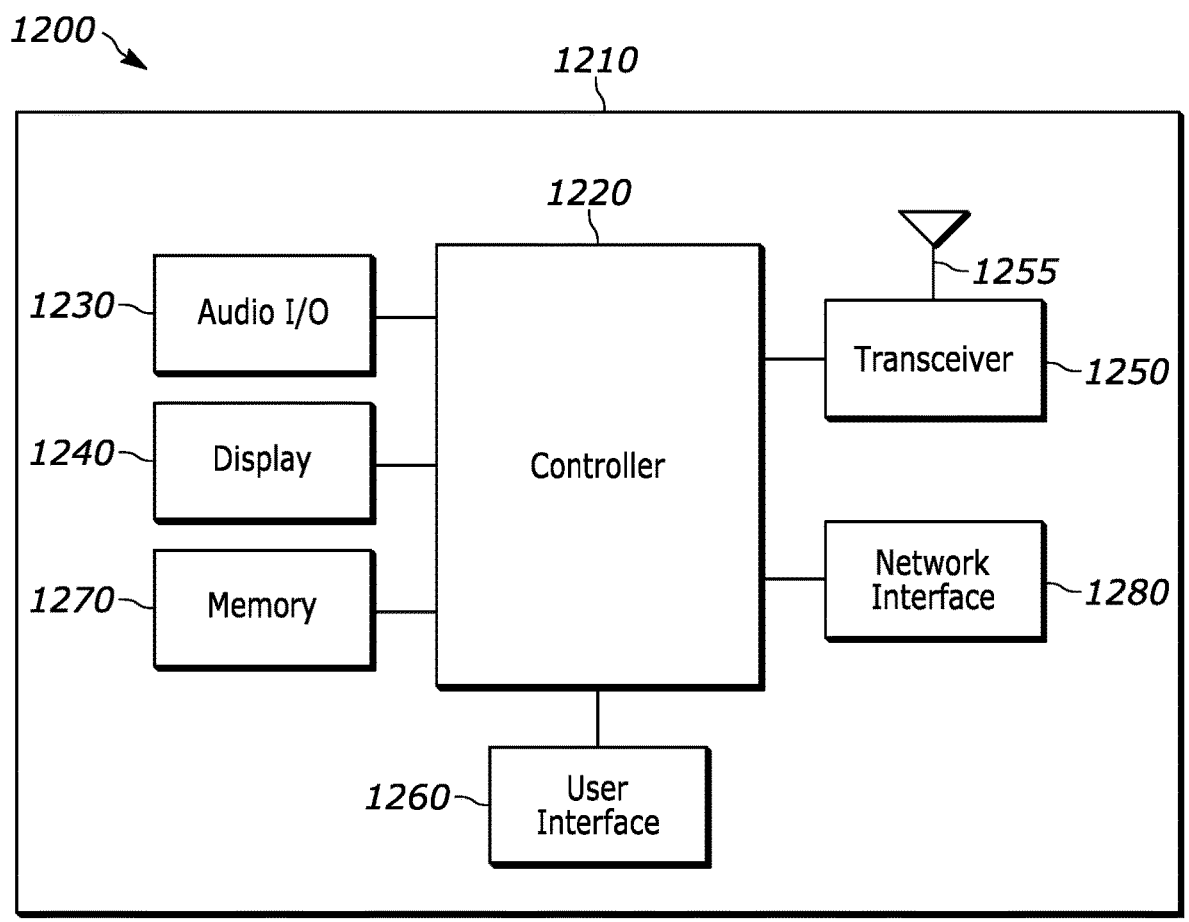
FIG. 12 is a block diagram of an exemplary apparatus according to a possible embodiment.

FIG. 12 is a block diagram 1200 of an exemplary apparatus, such as the wireless communication device 110, according to a possible embodiment. The apparatus 1200 can include a housing 1210, a controller 1220 within the housing 1210, audio input and output circuitry 1230 coupled to the controller 1220, a display 1240 coupled to the controller 1220, a transceiver 1250 coupled to the controller 1220, an antenna 1255 coupled to the transceiver 1250, a user interface 1260 coupled to the controller 1220, a memory 1270 coupled to the controller 1220, and a network interface 1280 coupled to the controller 1220. The apparatus 1200 can perform the methods described in all the embodiments The display 1240 can be a viewfinder, a liquid crystal display (LCD), a light emitting diode (LED) display, a plasma display, a projection display, a touch screen, or any other device that displays information. The transceiver 1250 can include a transmitter and/or a receiver. The audio input and output circuitry 1230 can include a microphone, a speaker, a transducer, or any other audio input and output circuitry. The user interface 1260 can include a keypad, a keyboard, buttons, a touch pad, a joystick, a touch screen display, another additional display, or any other device useful for providing an interface between a user and an electronic device. The network interface 1280 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 1270 can include a random access memory, a read only memory, an optical memory, a solid state memory, a flash memory, a removable memory, a hard drive, a cache, or any other memory that can be coupled to an apparatus.

The apparatus 1200 or the controller 1220 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 1270 or elsewhere on the apparatus 1200. The apparatus 1200 or the controller 1220 may also use hardware to implement disclosed operations. For example, the controller 1220 may be any programmable processor. Disclosed embodiments may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1220 may be any controller or processor device or devices capable of operating an apparatus and implementing the disclosed embodiments. Some or all of the additional elements of the apparatus 1200 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method in a user equipment comprising:
   identifying a data sequence for transmission;
   mapping the data sequence to multiple physical antennas to be involved in the transmission; and
   transmitting the data sequence using the multiple physical antennas from which a signal quality metric of a transmitter corresponding to a difference between a received signal associated with the transmission of each respective data symbol of the data sequence and a respective ideal location of a predefined constellation point associated with the data symbol that was transmitted can be determined, wherein an error vector magnitude involving an aggregated difference associated with the data sequence involving the transmission via the multiple physical antennas is determined;
   wherein the mapping of the data sequence to the multiple physical antennas is associated with multiple transmission layers, where each one of the multiple transmission layers is associated with one or more of the multiple physical antennas;
   wherein the error vector magnitude is associated with an output of a zero forcing multiple input multiple output (MIMO) receiver respectively applied to the multiple physical antennas;
   wherein the error vector magnitude is measured for the each one of the multiple transmission layers by comparing the data symbols of the data sequence with the corresponding output of the zero forcing MIMO receiver; and
   wherein a figure of merit for the transmitter is determined, which corresponds to a determined maximum one of the error vector magnitude measured for the each one of the multiple transmission layers.

2. The method in accordance with claim 1, wherein the mapping of the data sequence to the multiple physical antennas is associated with one or more antenna ports, where each of the antenna ports is associated with one or more of the multiple physical antennas.

3. The method in accordance with claim 2, wherein each of the antenna ports is defined as a respective linear combination of one or more of the multiple physical antennas.

4. The method in accordance with claim 2, wherein a fast Fourier transform is computed for the output of the receiver associated with a corresponding one of the multiple physical antennas.

5. The method in accordance with claim 4, wherein a separate zero forcing MIMO receiver is computed for each subcarrier of each allocated resource block, based on a channel estimate for each carrier for each of the multiple physical antennas.

6. The method in accordance with claim 5, wherein the separate zero forcing MIMO receiver that is computed for each subcarrier is applied to the output of the fast Fourier transform.

7. The method in accordance with claim 6, wherein the error vector magnitude is measured by comparing the data symbols of the data sequence with the corresponding output of the zero forcing MIMO receiver.

8. The method in accordance with claim 1, wherein a fast Fourier transform is computed for the output of the receiver associated with a corresponding one of the multiple physical antennas.

9. The method in accordance with claim 8, wherein a separate zero forcing MIMO receiver is computed for each subcarrier of each allocated resource block, based on a channel estimate for each carrier for each of the multiple physical antennas.

10. The method in accordance with claim 9, wherein the separate zero forcing MIMO receiver that is computed for each subcarrier is applied to the output of the fast Fourier transform.

11. The method in accordance with claim 10, wherein each output of the zero forcing MIMO receiver corresponds to a different one of the multiple transmission layers.

12. A method in a user equipment comprising:
identifying a data sequence for transmission;
mapping the data sequence to multiple physical antennas to be involved in the transmission; and
transmitting the data sequence using the multiple physical antennas from which a signal quality metric of a transmitter corresponding to a difference between a received signal associated with the transmission of each respective data symbol of the data sequence and a respective ideal location of a predefined constellation point associated with the data symbol that was transmitted can be determined, wherein an error vector magnitude involving an aggregated difference associated with the data sequence involving the transmission via the multiple physical antennas is determined;
wherein the mapping of the data sequence to the multiple physical antennas is associated with multiple transmission layers, where each one of the multiple transmission layers is associated with one or more of the multiple physical antennas;
wherein the error vector magnitude is associated with an output of a zero forcing multiple input multiple output (MIMO) receiver respectively applied to the multiple physical antennas;
wherein the error vector magnitude is measured for the each one of the multiple transmission layers by comparing the data symbols of the data sequence with the corresponding output of the zero forcing MIMO receiver; and
wherein the signal quality metric for the transmitter is the average of the error vector magnitude measured for the each one of the multiple transmission layers.

13. A user equipment including multiple physical antennas, the user equipment comprising:
a controller that identifies a data sequence for transmission, wherein the data sequence is mapped by the controller to the multiple physical antennas involved in the transmission; and
a transmitter that transmits the data sequence using the multiple physical antennas from which a signal quality metric of a transmitter corresponding to a difference between a received signal associated with the transmission of each respective data symbol of the data sequence and a respective ideal location of a predefined constellation point associated with the data symbol that was transmitted can be determined, wherein an error vector magnitude involving an aggregated difference associated with the data sequence involving the transmission via the multiple physical antennas is determined;
wherein the mapping of the data sequence to the multiple physical antennas by the controller is associated with multiple transmission layers, where each one of the multiple transmission layers is associated with one or more of the multiple physical antennas;
wherein the error vector magnitude is associated with an output of a zero forcing multiple input multiple output (MIMO) receiver respectively applied to the multiple physical antennas;
wherein the error vector magnitude is measured for the each one of the multiple transmission layers by comparing the data symbols of the data sequence with the corresponding output of the zero forcing MIMO receiver; and
wherein a figure of merit for the transmitter is determined, which corresponds to a determined maximum one of the error vector magnitude measured for the each one of the multiple transmission layers.

14. The user equipment in accordance with claim 13, wherein the mapping of the data sequence to the multiple physical antennas by the controller is associated with one or more antenna ports, where each of the antenna ports is associated with one or more of the multiple physical antennas.

* * * * *